United States Patent
Cocuzza et al.

(10) Patent No.: US 6,523,753 B2
(45) Date of Patent: Feb. 25, 2003

(54) SYSTEM FOR READING BARCODE SYMBOLS

(75) Inventors: Paul Cocuzza, West Nyack, NY (US); Anthony M. Gangemi, Bethpage, NY (US); Jerome Swartz, Old Field, NY (US)

(73) Assignee: Symbol Technologies, Inc., Hortsville, NY (US)

( * ) Notice: Subject to any disclaimer, the term of this patent is extended or adjusted under 35 U.S.C. 154(b) by 9 days.

(21) Appl. No.: 09/812,440

(22) Filed: Mar. 20, 2001

(65) Prior Publication Data

US 2001/0027997 A1 Oct. 11, 2001

Related U.S. Application Data

(63) Continuation-in-part of application No. 09/189,533, filed on Nov. 10, 1998, now Pat. No. 6,307,208.

(51) Int. Cl.⁷ .................................................. G06N 7/10
(52) U.S. Cl. .................. 235/472.01; 235/383
(58) Field of Search .................... 235/375, 383, 235/381, 492, 472.01–472.03, 462.01–462.45; 400/472, 477, 478, 479

(56) References Cited

U.S. PATENT DOCUMENTS

| | | | | |
|---|---|---|---|---|
| 4,323,773 A | * | 4/1982 | Carpenter | 235/473 |
| 4,850,009 A | * | 7/1989 | Zook et al. | 379/96 |
| 5,015,831 A | | 5/1991 | Eastman et al. | 235/462 |
| 5,094,396 A | | 3/1992 | Burke | 242/107.1 |
| 5,189,291 A | | 2/1993 | Siemiatkowski | 235/472 |
| 5,349,497 A | * | 9/1994 | Hanson et al. | 361/683 |
| 5,410,141 A | * | 4/1995 | Koenck et al. | 235/462.47 |
| 5,422,472 A | * | 6/1995 | Tavislan et al. | 235/472 |
| D365,334 S | | 12/1995 | Pearl | D14/107 |
| 5,477,238 A | | 12/1995 | Aharanson et al. | 345/168 |
| 5,488,223 A | * | 1/1996 | Austin et al. | 235/375 |
| 5,517,434 A | * | 5/1996 | Hanson et al. | 361/683 |
| 5,521,370 A | * | 5/1996 | Hanson | 235/462.46 |
| 5,625,180 A | * | 4/1997 | Hanson et al. | 235/472.01 |
| 5,633,489 A | | 5/1997 | Dvorkis et al. | 235/472 |
| 5,656,804 A | | 8/1997 | Barkan et al. | 235/472 |
| 5,679,943 A | * | 10/1997 | Schultz et al. | 235/472.02 |
| D386,754 S | | 11/1997 | Gifford et al. | D14/107 |
| 5,691,528 A | | 11/1997 | Wyatt et al. | 235/462 |
| 5,708,262 A | * | 1/1998 | Goldman et al. | |
| 5,822,080 A | | 10/1998 | Chavez | 358/374 |
| 5,841,553 A | | 11/1998 | Neukermans | 358/494 |
| 5,898,162 A | * | 4/1999 | Koenck et al. | 235/462.01 |
| 6,036,098 A | * | 3/2000 | Goldman et al. | 235/486 |
| 6,056,193 A | | 5/2000 | McAuliffe et al. | 235/380 |
| 6,097,607 A | * | 8/2000 | Carroll et al. | 361/752 |
| 6,312,175 B1 | * | 11/2001 | Lum | 400/472 |
| 6,349,001 B1 | * | 2/2002 | Spitzer | 359/618 |
| 2001/0043882 A1 | * | 11/2001 | Berger et al. | 422/67 |

* cited by examiner

*Primary Examiner*—Thien M. Le
(74) *Attorney, Agent, or Firm*—Kirschstein, et al.

(57) ABSTRACT

An apparatus for reading indicia having parts of different light reflectivity includes a keyboard for inputting data, a monitor for housing a display, and a reader for reading said indicia, wherein said reader is retractably integrated into either said keyboard, monitor, or a point-of-sale terminal. The apparatus has a particular application in reading barcode symbols in instances where there is a need to save space or where there is a need to avoid the cost of purchasing a separate reader component.

5 Claims, 9 Drawing Sheets

SYSTEM FOR READING BARCODE SYMBOLS

CROSS-REFERENCE TO RELATED APPLICATION

This application is a continuation-in-part of U.S. patent application Ser. No. 09/189,533, filed Nov. 10, 1998, now U.S. Pat. No. 6,307,208.

BACKGROUND OF THE INVENTION

1. Field of the Invention

The present invention pertains to the reading of indicia having parts of different reflectivity, such as barcode symbols, and more particularly, to a reader for reading indicia which is retractably integrated into either a keyboard or a monitor. The invention has a particular application in reading barcode symbols in instances where there is a need to save space or where there is a need to avoid the cost of purchasing a separate reader component.

2. Description of Related Art

Various optical readers and scanning systems have been developed for reading barcode symbols appearing on a label or the surface of an article. The barcode symbol itself can be a coded pattern of indicia comprising a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters intended to be descriptive of the article or some characteristic of it. Such characters typically are represented in digital form and utilized as an input to a data processing system for applications in point-of-sale processing, inventory control and other applications. Scanning systems of this general type have been disclosed, for example, in U.S. Pat. Nos. 4,251,798; 4,360,798; 4,369,361; 4,387,297; 4,409,470 and 4,460,120, all assigned to the assignee of the present invention and incorporated herein by reference.

One embodiment of such a scanning system, as disclosed in some of the above patents, resides in, inter alia, a hand-held, portable laser scanning head supported by a user. The scanning head is configured to enable the user to aim the head at a target to emit a light beam toward a symbol to be read. In another embodiment, the scanning system is a generally bigger and separate workstation, which communicates with a data processing unit. For example, U.S. Pat. No. 4,369,361 discloses such a system and is assigned to the assignee of the present invention and is incorporated herein by reference.

The light source in a laser scanner is typically a gas or semiconductor laser. Use of semiconductor devices as the light source in scanning systems is particularly desirable because of its small size, low cost and low power requirements. The laser beam is optically modified, typically by a lens, to form a beam spot of a certain size at the target distance. In the one embodiment, the beam spot size at the target distance is approximately the same as the minimum width between regions of different light reflectivity, i.e., the bars and spaces of the symbol.

The barcode symbols are formed from bars or elements typically rectangular in shape with a variety of possible widths. The specific arrangement of elements defines the character represented according to a set of rules and definitions specified by the code or "Symbology" used. The relative size of the bars and spaces is determined by the type of coding used, as is the actual size of the bars and spaces. The number of characters per inch represented by the barcode symbol is referred to as the density of the symbol. To encode a desired sequence of characters, a collection of element arrangements is concatenated together to form the complete barcode symbol, with each character of the message being represented by its own corresponding group of elements. In some symbologies, a unique "start" and "stop" character is used to indicate where the barcode begins and ends. A number of different barcode symbologies exist. These symbologies include UPC/EAN, Code 39, Code 128, Codabar, and Interleaved 2 or 5, among others.

In order to increase the amount of data that can be represented or stored on a given amount of surface area, several new barcode symbologies have recently been developed. One example of such a symbology is known as two-dimensional (2D) symbology and is discussed in detail in commonly assigned U.S. Pat. Nos. 5,243,655 and 5,304,786, which are incorporated herein by reference. Briefly, that symbology involves a variable number of component symbols of "code words" per row of a nonvolatile electro-optical read-only memory imprinted on a substrate. Code words in alternating rows are selected from mutually exclusive subsets of a mark pattern, the subsets being defined in terms of particular values of discriminator function which is illustrated in the referenced patents as being a function of the widths of bars and spaces in a given code word.

In the scanning systems known in the art, the light beam is directed by a lens or similar optical components along a light path toward a target that includes a barcode symbol on the surface. The scanning systems function by repetitively scanning the light beam in a line or series of lines across the symbol. The scanning component may either sweep the beam spot across the symbol and trace a scan line across the symbol or scan the field of view of the scanner, or do both.

Scanning systems also include a sensor or photodetector, which functions to detect light reflected from the symbol. The photodetector is therefore positioned in the scanner or in an optical path in which it has a field of view, which extends across and slightly past the symbol. A portion of the reflected light which is reflected off the symbol is detected and converted into an electrical signal. Electronic circuitry or software thereafter decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric character so represented.

The decoding process in known scanning systems usually works in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read such as a green light and/or an audible beep is provided to the user. Otherwise, the decode receives the next scan, performs another decode attempt of that scan, and so on, until a completely decoded scan is achieved or no more scans are available.

Decoding 2D symbology is discussed particularly and shown in various flowcharts set forth in the 2D symbology patents incorporated by reference and above identified.

More sophisticated scanning, described in U.S. Pat. No. 5,235,167, assigned to the assignee of this invention, and incorporated herein by reference, carries out selective scanning of 1-D and 2-D barcodes. Preliminary information, such as the barcode type and size, is first decoded during an aiming mode of operation when a relatively narrow and visible raster pattern is impinged on the target. Based upon the preliminary information received by the scanner in the form of light reflected from the target, converted to an electrical signal and decoded, an appropriately sized raster scan pattern is generated. If the barcode pattern is found to be skewed or misaligned with respect to the direction of the raster scanning pattern, the pattern is generated with an orientation in alignment with the barcode.

Another type of barcode reader performs an omni-directional scan. For example, U.S. Pat. No. 5,481,099, assigned to the assignee of the present invention and incorporated herein by reference, shows a scanner for reading indicia having portions of differing light reflectivity which has a means for directing a light beam from the scanner towards the indicia and collecting reflected light returning from the indicia. The scanner includes a scanning arrangement with a scanner component, such as a mirror. First and second vibratory means support the scanner component for angular oscillatory movement to scan the light beam in first and second orthogonal scan directions. The scanning arrangement includes read-start means for moving the scanner component to simultaneously scan the light beam in the first and second scan directions. Control means, operatively connected to the read-start means, are provided for imparting differing signals to the read-start means to (1) alternatively drive fast and slow vibrations of the first and second vibratory means to vary the scanning of the light beam in the first scan direction and (2) to drive vibration of only the second vibratory means to cause the scanning of the light beam in the second scan direction. The scanning of the light beam in the first and second scan directions generates a scan pattern over the indicia.

Another type of barcode reader is one which incorporates an imaging sensor, such as a charge coupled device or other solid state imaging device. Examples of such a reader are shown in U.S. Pat. Nos. 5,672,858 and 5,591,952, assigned to the assignee of the present invention and incorporated herein by reference.

CCDs consist of an array of many detectors, commonly referred to as "pixels." The entire symbol is flooded with light from the reader or ambient light, and each pixel is sequentially read out to determine the presence of a bar or a space. Such readers are light-weight and easy to use, but require substantially direct contact or placement of the reader on the symbol to enable the symbol to be properly read. Such a physical contact of the reader with the symbol is preferred mode of operation for many applications, or as a matter of personal preference by the user.

A basic figure of merit in scanning CCD arrays is a so-called "pixels per module" detection. If detection capability fall below such a figure of merit, scanning cannot proceed since requisite sensitivity is not present.

As noted above briefly, one type of a scanning system is a separate scanning workstation that communicates with a data processing unit. As shown in U.S. Pat. No. 4,369,361, the workstation can take up a significant amount of working space. Also, the workstation can take up an additional port space on the data processing unit. Of course, there are situations where space is at a premium or cannot be spared. In such situations, an additional scanning workstation can cause great inconvenience or cannot be used. Additionally, the workstation can necessitate additional costs: purchasing and maintenance costs, for example. There is a need for an improved scanning system that overcomes the above noted shortcomings.

SUMMARY OF THE INVENTION

The present invention provides an improved apparatus for reading indicia having parts of different light reflectivity comprising a reader retractably integrated into a keyboard or a monitor, so that savings are achieved in space and cost over having a separate reader component.

In one embodiment, an apparatus for reading indicia having parts of different light reflectivity, comprises a keyboard for inputting data; and a reader for reading the indicia, wherein the reader is retractably integrated into the keyboard.

The reader may comprise a laser scanner or an imaging device for imaging the indicia. Additionally, the reader may comprise a CCD imaging device for imaging the indicia. The reader may comprise a light emitting means for two-directionally or omni-directionally scanning the indicia.

The reader may be retractably integrated at various positions. For example, the reader may be integrated at a right top portion of the keyboard, a left top portion of the keyboard, a right side portion of the keyboard, a left side portion of the keyboard. Also, the reader may comprise a light emitting means for emitting light directed at a variable angle from a planar surface of the keyboard.

Also, the keyboard may obtain power and transmit data through a cable connected to a data processing unit, the reader may be integrated into the keyboard, and the reader may obtain power and transmit data through the cable. Alternatively, the reader may transmit data by sending radio frequency signals. Also, the reader may be adjustably oriented at different angles from a planar surface of the keyboard.

In another embodiment, an apparatus for reading indicia having parts of different light reflectivity comprises a monitor for housing a display; and a reader for reading the indicia, wherein the reader is retractably integrated into the monitor.

Similar to the above embodiment, the reader may comprise a laser scanner or an imaging device fore imaging the indicia. The reader may comprise a light emitting means for emitting light directed at a variable angle from a planar surface of the monitor. Also, the reader may be adjustably oriented at different angles from a planar surface of the monitor.

In another embodiment, an apparatus for reading indicia having parts of different light reflectivity comprises a keyboard for inputting data; and a reader for reading the indicia, wherein the reader is retractably integrated into the keyboard, and the reader comprises a light emitter for emitting light through a surface of either the keyboard; an optical scanning means for automatically causing the light from the emitter to scan across the indicia; a photodetector for sensing light reflected from the indicia and producing an electrical signal representative of the indicia; and a signal processing means for analyzing the indicia represented by the electrical signal and providing a decoded information representative of the indicia.

Again, the reader may comprise a light emitting means for two-directionally or omni-directionally scanning the indicia. Also, the reader may be positioned at different locations. For example, the reader may be retractably integrated into a top right portion of the keyboard, a left top portion of the keyboard, a right side portion of the keyboard, or a left side portion of the keyboard.

Furthermore, the reader may comprise a light emitting means for emitting light directed at a variable angle from a planar surface of the keyboard. Also, the keyboard may obtain power and transmit data through a cable connected to a data processing unit, the reader is integrated into the keyboard, and the reader may obtain power and transmit data through the cable. Alternatively, the reader may transmit data by sending radio frequency signals. Also, the reader may be adjustably oriented at different angles from a planar surface of the keyboard.

In another embodiment, an apparatus for reading indicia having parts of different light reflectivity comprises a monitor for housing a display; and a reader for reading the indicia, wherein the reader is retractably integrated into the monitor, and the reader comprises a light emitter for emitting light through a surface of either the monitor; an optical scanning means for automatically causing the light from the emitter to scan across the indicia; a photodetector for sensing light reflected from the indicia and producing an electrical signal representative of the indicia; and a signal processing means for analyzing the indicia represented by the electrical signal and providing a decoded information representative of the indicia.

The reader may comprise a light emitting means for emitting light directed at a variable angle from a planar surface of the monitor. Also, the reader may be adjustably oriented at different angles from a planar surface of the monitor.

In another embodiment, an apparatus for reading indicia having parts of different light reflectivity comprises a keyboard; and a reading means for reading the indicia, wherein the reading means is retractably integrated into the keyboard, and the reading means comprises a light emitter for emitting light to illuminate sequential portions of the indicia through a surface of the keyboard; an array of solid state imaging devices for detecting light reflected from portions of the indicia by scanning a field of view and for generating an electrical signal representative of the portions of the indicia; and a signal processor for analyzing the indicia represented by the electrical signal and providing a decoded information representative of the indicia.

The reader may comprise a CCD imaging device for imaging the indicia. Also, the reader may comprise a light emitting means for two-directionally or omni-directionally scanning the indicia.

The reader may be positioned at different locations. For example, the reader may be retractably integrated into a right top portion of the keyboard, a left top portion of the keyboard, a right side portion of the keyboard, or a left side portion of the keyboard. The reader may comprise a light emitting means for emitting light directed at a variable angle from a planar surface of the keyboard. Also, the keyboard may obtain power and transmit data through a cable connected to a data processing unit, the reader is integrated into the keyboard, and the reader may obtain power and transmit data through the cable. The reader may also transmit data by sending radio frequency signals. Also, the reader may be adjustably oriented at different angles from a planar surface of the keyboard.

In another embodiment, an apparatus for reading indicia having parts of different light reflectivity comprises a monitor for housing a display; and a reader for reading the indicia, wherein the reader is retractably integrated into the monitor, and the reading means comprises a light emitter for emitting light to illuminate sequential portions of the indicia through a surface of the monitor; an array of solid state imaging devices for detecting light reflected from portions of the indicia by scanning a field of view and for generating an electrical signal representative of the portions of the indicia; and a signal processor for analyzing the indicia represented by the electrical signal and providing a decoded information representative of the indicia.

The reader may comprise a light emitting means for emitting light directed at a variable angle from a planar surface of the monitor. Also, the reader may be adjustably oriented at different angles from a planar surface of the monitor.

In another embodiment, an apparatus for reading indicia having parts of different light reflectivity comprises a point-of-sale unit; and a reader for reading the indicia, wherein the reader is integrated into the point-of-sale unit.

The reader may comprise a laser scanner or an imaging device for imaging the indicia. Also, the reader may comprise a light emitting means for emitting light directed at a variable angle from a planar surface of the point-of-sale unit. Also, the reader may be adjustably oriented at different angles from a planar surface of the point-of-sale unit.

The above and other advantages, features and aspects of the present invention will be more readily perceived from the following description of the preferred embodiments thereof taken together with the accompanying drawings and claims.

BRIEF DESCRIPTION OF THE DRAWINGS

Other objects, features, and benefits of the present invention will become apparent from the following detailed description of preferred embodiments thereof taken in conjunction with the accompanying figures, wherein.

DETAILED DESCRIPTION OF THE PREFERRED EMBODIMENTS

Figure 1:
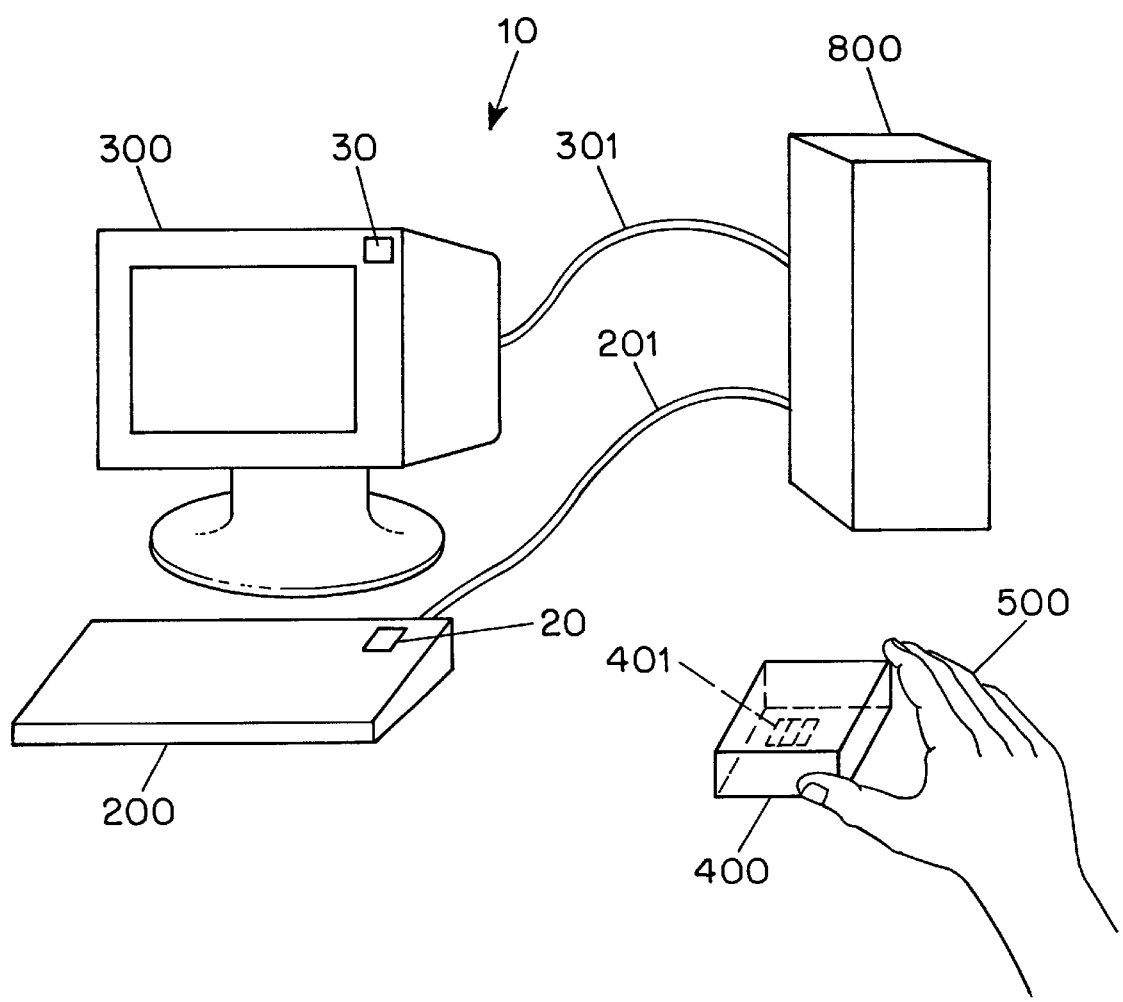
FIG. 1 is a perspective view of an apparatus for reading indicia having parts of different light reflectivity comprising a reader integrated into a keyboard or a monitor, according to a first embodiment of the invention.
Figure 2:
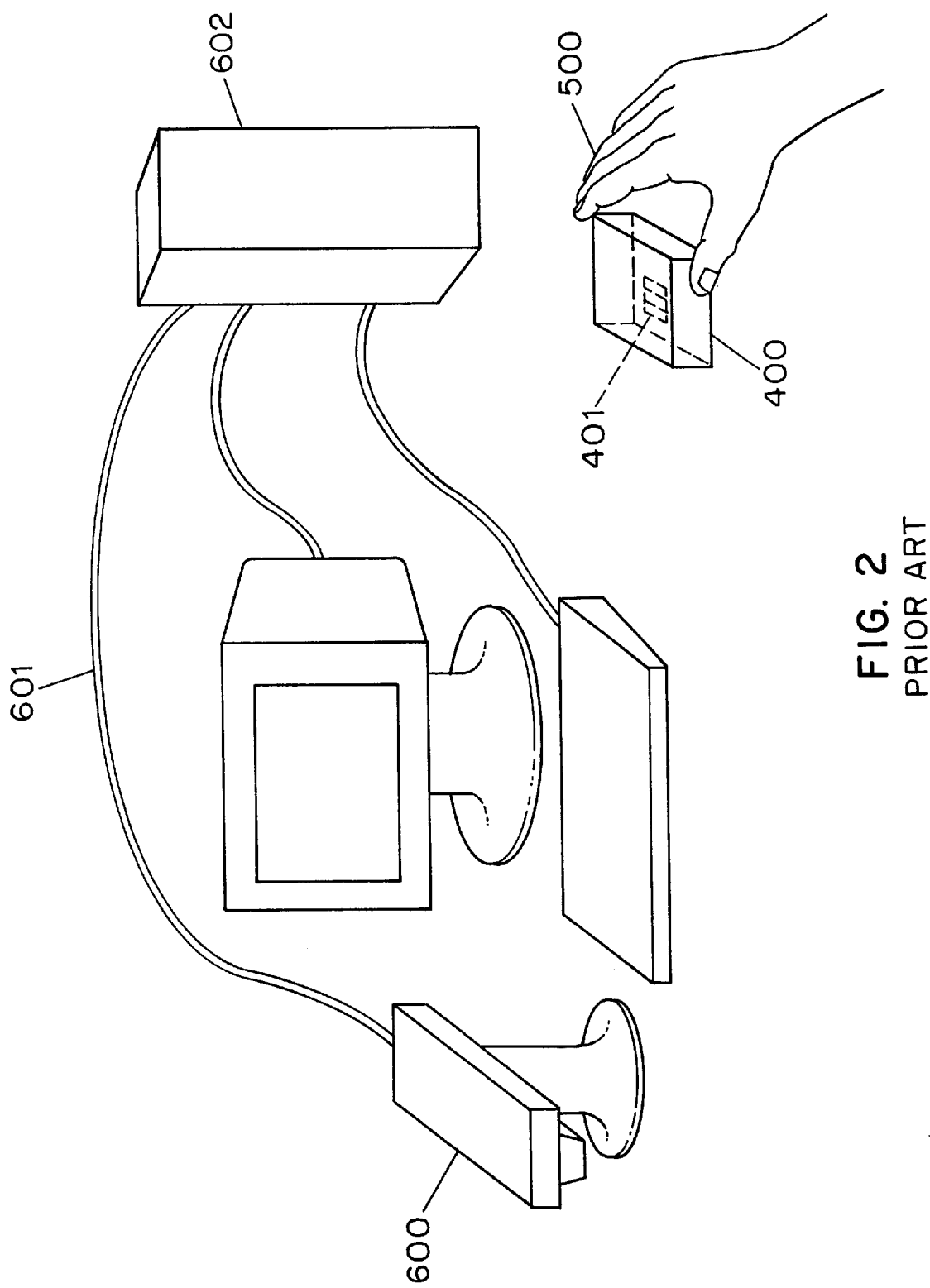
FIG. 2 is a perspective view of an apparatus for reading indicia in the related art.

With reference to FIG. 1, a first embodiment of the present invention is indicated generally by the reference numeral 10. Reader 20 for reading barcode symbols is integrated into keyboard 200 and reader 30 is integrated into monitor 300. The keyboard, in one embodiment, may be a standard computer keyboard with a full set of alphanumeric characters. Of course, just one reader may be used as needed (e.g., just reader 20 being used with a monitor that does not have a reader). This arrangement according to the present invention saves space and cost in obviating a dedicated reader module 600, an associated cable 601, and port space on a data processing system 602, which as shown in FIG. 2, take up additional space. For brevity sake, the associated electronics in the keyboard and the monitor are not shown and may include relatively standard electronics. The monitor could be a CRT monitor, a touch-screen monitor, an LCD monitor, or another type of monitor.

In operation, for example, a user 500 can cause the barcode symbol 401 on an object 400 to move over either reader 20 or reader 30. The object 400 could be any object with a barcode symbol, but could, for example, be an ID card used at motor vehicle centers. The reader may be a laser scanner and/or an imaging device (which, for example, could be a CCD imaging device).

Figure 3:
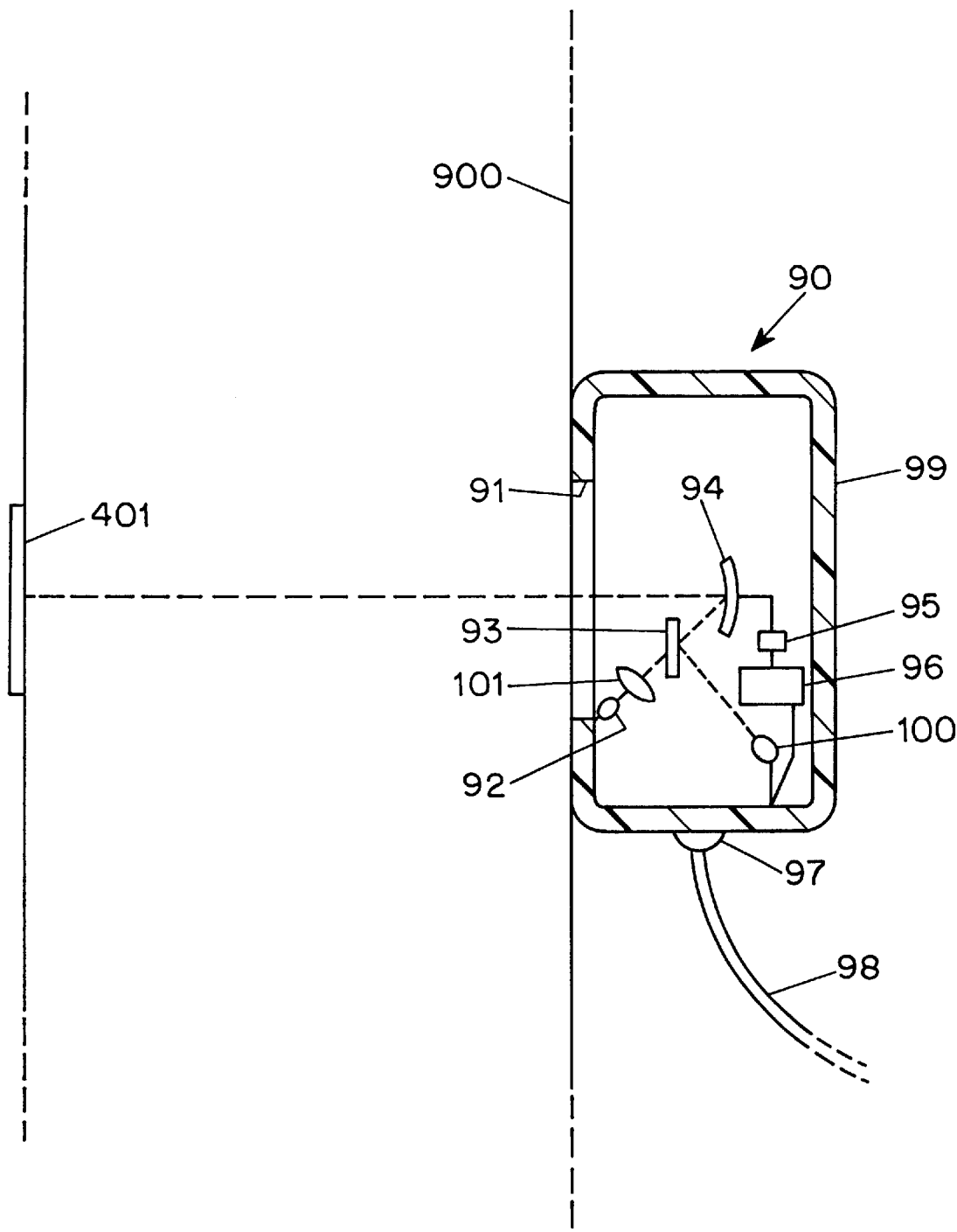
FIG. 3 is a schematic side view of a reader of the embodiment shown in FIG. 1.

More specifically, as an example, FIG. 3 shows reader 90 integrated into either a monitor or a keyboard 900. The reader 90 may be enclosed in housing 99, which may be integral to monitor/keyboard 900. Alternatively, the housing may be attached to the monitor/keyboard 900 by adhesive, screws, or other fastening means. In FIG. 3, the housing 99 contains a semiconductor laser light source 92, photodetector 100, optics 101, 93, and 94 and signal processing/control circuitry 96.

In operation, a suitable lens or a multiple lens system, will focus the scanned beam onto the barcode symbol 401 at an appropriate reference frame through window 91. The semiconductor light source 92 is positioned to introduce a light beam into the axis of the lens 101, and the beam passes through a partially silvered mirror 93 and other lenses or beam shaping structure, as needed. An oscillating mirror 94 is connected to a scanning motor 95 that is driven by the signal processing/control circuitry 96. Signals to and from the signal processing/control circuitry 96 are carried by exit port 97 and line 98 to a data processing unit, either directly or via the keyboard or monitor circuitry. Line 98 may also supply power to the reader 90, although it is also possible to have an internal power source, such as a battery, within the housing 99.

Additionally, the reader according to the present invention may employ imaging technology, which may be useful for certain applications. As exemplified in FIG. 4, reader 150 is integrated into either a monitor or a keyboard 900, as in FIG. 3. The reader 150 may be enclosed in a housing (not shown) similar to the one shown in FIG. 3 and light is transmitted and received via window 155, which is similar to window 91 in FIG. 3.

The reader 150 optically images or focuses a barcode symbol 401, which is part of a field of view 402, onto a photodetector array 151 as 401', using a suitable optical system represented by a lens 152. A light source 153, for example, of the light-emitting diode type, or an incandescent or florescent lamp, or the like, illuminates the field of view 402 through a suitable lens system 154, although ambient light could be used to illuminate the field instead.

It is common to use red LEDs as the light source 153 and red filters in the optics to filter out unwanted light, thus increasing the signal-to-noise ratio. The photodetector array 151 is in one embodiment a charge coupled device (CCD) of the type commercially available, although other types of photodetector arrays are also suitable, such as a charge injection device (CID).

Instead of a CCD, for example, a light-responsive memory device can be used to both convert the image to a binary representation of incident light, and to store the binary data for access by a CPU for code recognition: one such memory device is an OpticRAM™ device commercially available from Micron Technology, Inc., Boise, Id. This OpticRAM™ device is a 64K or 256K dynamic RAM array having a light-transparent window above the chip in the I/C package, as described in U.S. Pat. No. 4,441,125. Various optical systems are known which enhance the function of imaging the field of view 402 onto the photodetector array 151, such as automatic focusing mechanisms of the type used in commercially available video and 35-mm cameras. It is understood that such equipment is useful in the practice of this invention. A zoom mechanism may be used to adjust the size of the image of the symbol 401 on the photodetector array 151.

Instead of a semiconductor device such as the CCD or RAM as discussed, the photodetector array 151 may be a vidicon of the type used for generating TV signals. Standard NTST video employs a vertical resolution of 525 lines in an interlaced raster scan, with a horizontal resolution usually about 400 pixels per line or less, depending upon the quality of the vidicon. As discussed below in regard to CCDs, the resolution needed for recognizing barcode symbols depends upon the type of barcode, the optics employed, size of field of view, average depth of field needed, and etc.

Figure 4:
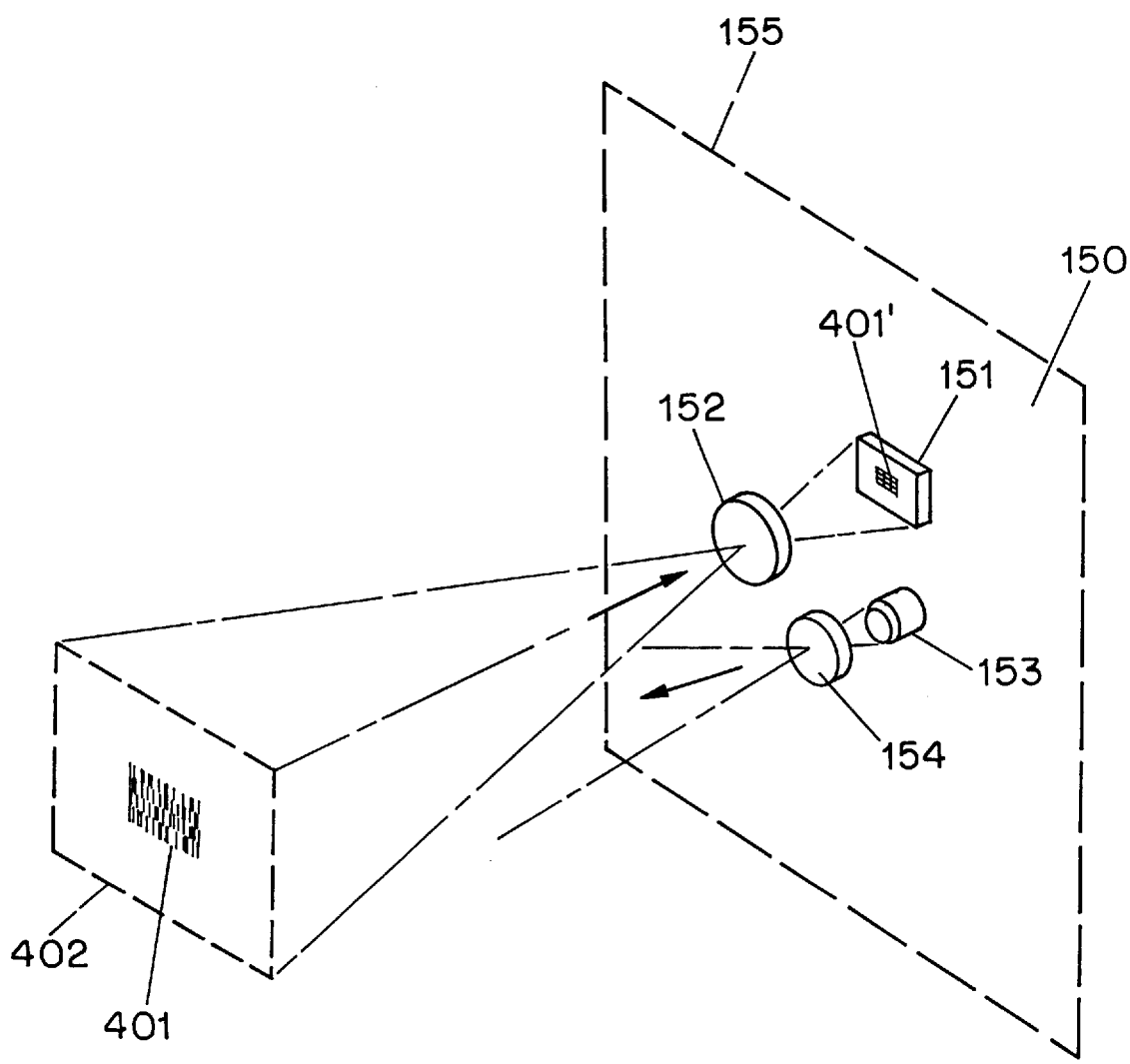
FIG. 4 is a perspective view of an apparatus for reading indicia, according to another embodiment of the invention.
Figure 5:
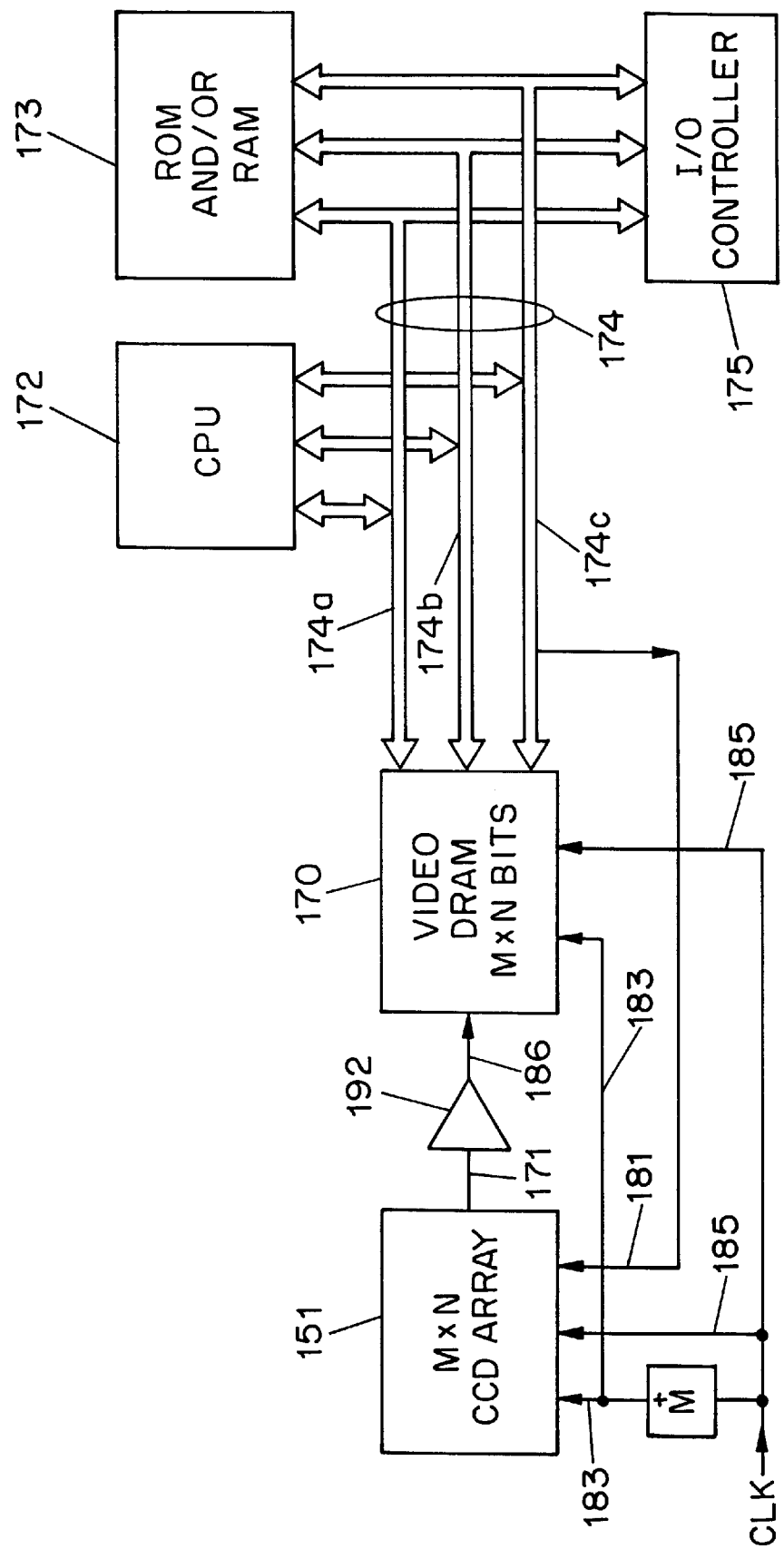
FIG. 5 is an electrical schematic diagram in block form of the embodiment of FIG. 4.

As illustrated in FIG. 5, the photodetector array 151 of FIG. 4 is used to generate an electrical image of the field of view 402 for transferring to a semiconductor memory device 170. The array 151 may be a CCD imaging device of the type used in hand-held video cameras of the consumer type, or the like.

Figure 6:
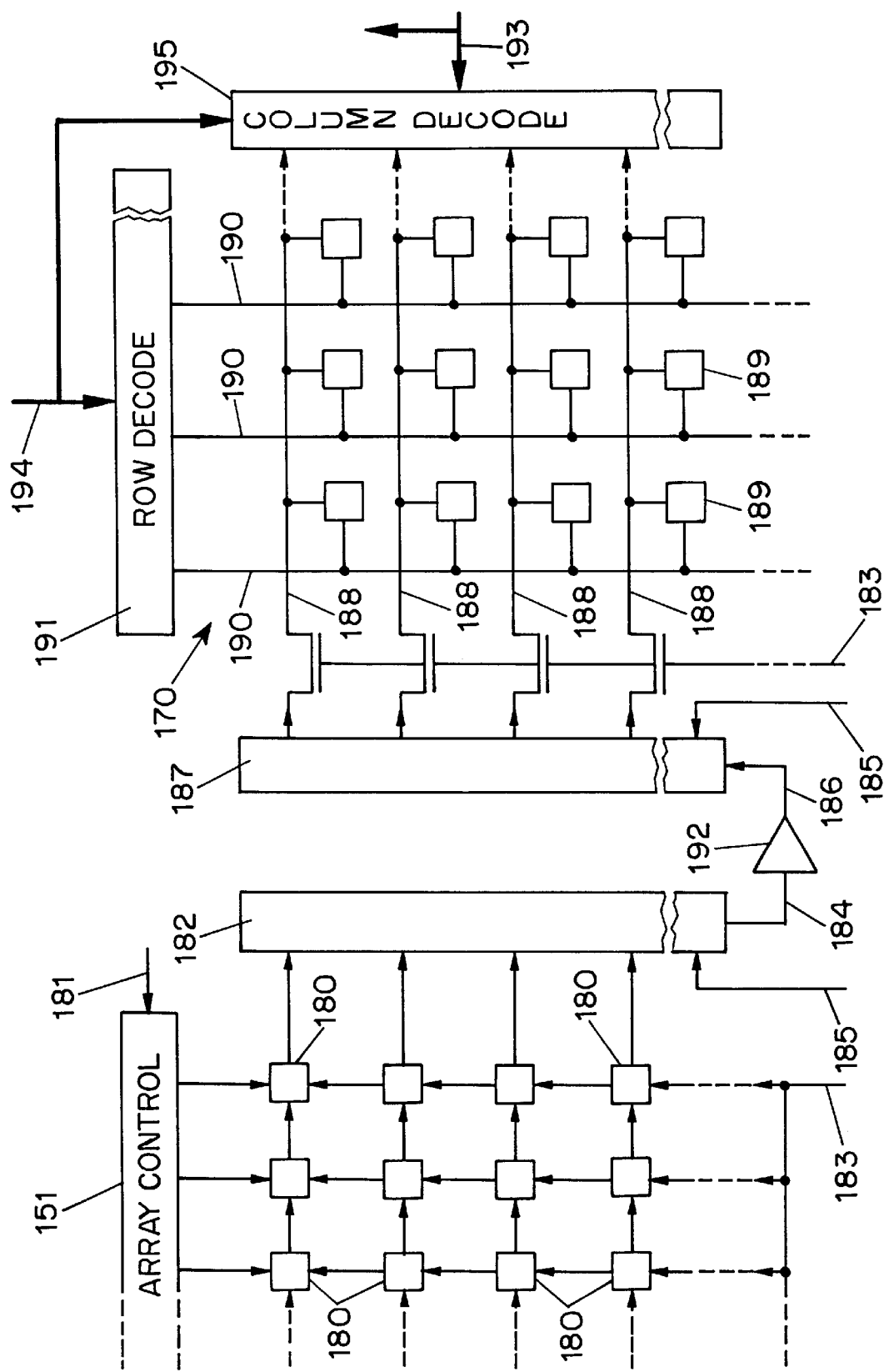
FIG. 6 is an electrical schematic diagram of the photodetector array and the memory array used in the circuit of FIG. 5.

A CCD device is a silicon chip made by integrated circuit manufacturing techniques and functions to create a serial output on a line 171 representing the light impinging upon each photo-responsive element or "picture element" (pixel) in the array. An enlarged view of a small part of the array in the CCD device 151 is shown in FIG. 6. A large number of photo-elements 180 are arranged in M rows and N columns in this array, where M and N are numbers representing the numbers of rows and columns. A control input 181 controls the light capture function, and a signal on input 181 causes each element to capture and store a charge responsive to the light then incident upon this element. The array is then no longer sensitive to light after this control input 181 is activated, and the charge packets stored in each element can be read out. To this end, the rows are shifted into an N-bit shift register 182, one column of elements at a time, by clock voltages applied to the elements 180 by lines 183. The shift register 182 is clocked out onto the line 184 by clock voltage input 185. The clock on line 183 can be derived from the clock on input 185 by dividing by N, the number of columns in the detector array 151.

The M×N array 151 may be 256×256, for example, meaning there are 256 rows of elements and 256 elements 180 in each row (256 columns). In this case, the clock 185 would occur 256 times for each one of the clocks on line 183. The density of the array 151 is selected according to the resolution required for the system, and may be less than 256×256, or more. However, continuing with this example, note that the memory 170 may also be a 256×256 array, in which case a one-for-one correspondence is provided between the elements of the array 151 and the memory cells of the memory device 170. For example, a 64K-bit video DRAM of the type commercially available under the part number TMS4161 provides a 256×256 cell array having both serial and random-access I/O ports. This video DRAM device is one example of a device suited for use as the memory device 170 because serial access can be at a much higher clock rate than the cycle time for random access and because random access can be occurring at the same time as serial loading of the memory from the CDD occurs.

If higher resolution is needed, 256K video DRAMs are available providing 512×512 pixel arrays (higher resolution than commercial TV, for example), or 1-Mbit video DRAMs providing 1024×1024 arrays. For high density symbols (using the maximum density of Code-49, for example), a 2048×2048 memory 170 paired with a 2048×2048 CCD might be optimum. The 2048×2048 bit video DRAM could be comprised of four 1-Mbit video DRAMS, since 4-Mbit video DRAMs are not available at this time. Also, other types of memory devices may be employed instead of video DRAMs. For example, standard DRAMs having "by 4" I/O data lines may be used, or static RAMs with 4-bit or 8-bit wide data I/O paths. Static RAMs provide faster access than DRAMs, but use more power and are more expensive.

In the circuit of FIGS. 5 and 6, the clock input 185 used to shift the bits out of the N-bit shift register 182 of the CCD device 151 is also used as a serial clock input 185 to the video DRAM, since the data will be clocked out of the CCD 151 in synchronization with clocking-in of the serial data bits at serial input 186 to the DRAM 170. Likewise, the same clock 183 used to shift the columns of charge packets into the shift register 182 of the CCD can be used to transfer the N bits of incoming data from a shift register 187 in the input of the video DRAM 10 to column lines 188 in the cell array. The DRAM 170 has an array of dynamic memory cells 189 in rows and columns having a one-for-one correspondence to the photo-responsive elements 180, so there are M rows and N columns of cells. So after N clock pulses (256, in the example) on the input 185, the shift register 187 is full, and one clock on input 183 loads this N-bits of data onto the N column lines 188. Then, one or the N row lines 190 is activated by a row decoder to load this N-bits of data to one of the rows of memory cells 188, where they will remain stored until written over.

The sequence then repeats. Another N bits are shifted into shift register 182 of the CCD, then clocked out by clock 185 while being clocked into the shift register 187 of the DRAM 170. So, after M×N clocks on line 183, or N clocks on line 185, all M×N (64K-bits, i.e., 65,536 bits, in the example) of data form the photodetector 151 will have been transferred to the DRAM 170. The detected light at picture elements 180 of the photodetector device 151 is thus transformed into electrical charge packets which are transferred in a bit-mapped manner into the memory 170 one-for-one, in corresponding locations. A threshold-responsive buffer 192 is used between the output 184 of the CCD and the DRAM input 186 if the output 184 is analog instead of digital, so that the input 186 is either a binary one or a zero, not a variable-level voltage.

The bit-mapped image in the memory 170 is accessed by a CPU device 172 of FIG. 5, where this CPU may be an 8-bit or 16-bit micro controller or microprocessor such as part numbers 8042 or 8051 (microcontroller devices) or 8086/8088 (microprocessor devices) manufactured by Intel Corporation of Santa Clara, Calif. The microprocessor type selected depends upon the level of performance needed for the particular system. The 8051 type of microcontroller has an internal (on-chip) ROM or EPROM for program storage, and an internal RAM for temporary data storage, while an 8086 type of microprocessor requires an external memory 173 for storing programs and data. If an external read/write memory 173 is included, the image data from memory 170 can be loaded into this memory 173 for further processing, such as employing graphics algorithms of the translate/rotate type. For example, if the memory 170 is used as the principle storage location for the image data, however, then rewriting transposed image data to this memory 170 by the CPU 172 will destroy existing image data, allowing limited transposition. A system bus 174 includes an address bus 174a, a data bus 174b and a control bus 174c. The bus is used for accessing the memory 173 if one is needed, and of course, for accessing the video DRAM 170, as well as for accessing an I/O controller (or controllers) 175 for communicating with a keyboard input, a display, or data output to a host computer, or the like.

The video DRAM 170 is a dual-ported memory; in addition to the serial port 186 described above, the video DRAM 20 has "random access" type of data I/O port 193 connected to the data bus 174b for accessing the bit-mapped image data by the CPU. The video DRAM can have a 4-bit wide data I/O port 193, so four bits are accessed in parallel at one time, instead of 1-bit. The video DRAM has a multiplexed address input on lines 194 connected to address bus 174a. A row address is applied first, along with a row address strobe on the control bus 174c. Then, a column address is applied along with a column address strobe. These addresses are loaded into address buffers for the row and column decoders 191 and 195. Thus, for a 64K video DRAM, an 8-bit address is applied to the decoder 191 from the CPU to make a 1-of-256 selection for loading the serial register 187 to one of the rows of the cells 189. This loading also requires the sense amplifiers to be strobed, which occurs when the row address strobe is activated. If an 8-bit address is applied to the decoder 191 to select a row for input to the column decoder 195 from the CPU to select a column or columns for output on the data I/O bus 193 via the data bus 174b to the CPU 172. In this manner, the CPU accesses the bit-mapped image data in the memory 170 to thereby scan and interpret the image of the field of view 402, find the symbol 401, and decode the characters in the symbol. The above discussion provides and example of an imaging device using CCD technology. Of course, other types of imaging devices may be used (e.g., as noted above, a CID, a vidicon, and others).

Turning back to FIG. 1, keyboard 200 may obtain power and transmit data through cable 201 connected to a data processing unit 800. The reader 20 may then obtain power and transmits data through cable 201. Similarly, monitor 300 may obtain power and transmit data through cable 301 connected to a data processing unit 800. The reader 30 may then obtain power and transmits data through cable 301. Alternatively, readers 20 and 30 may transmit data by sending radio frequency signals to a data processing unit, either to data processing unit 800 or to another data processing unit.

Furthermore, the reader 20 or 30 may be a light emitting means for one, two, and/or omni-directionally scanning the indicia, using means disclosed in the related patents discussed above.

Figure 7:
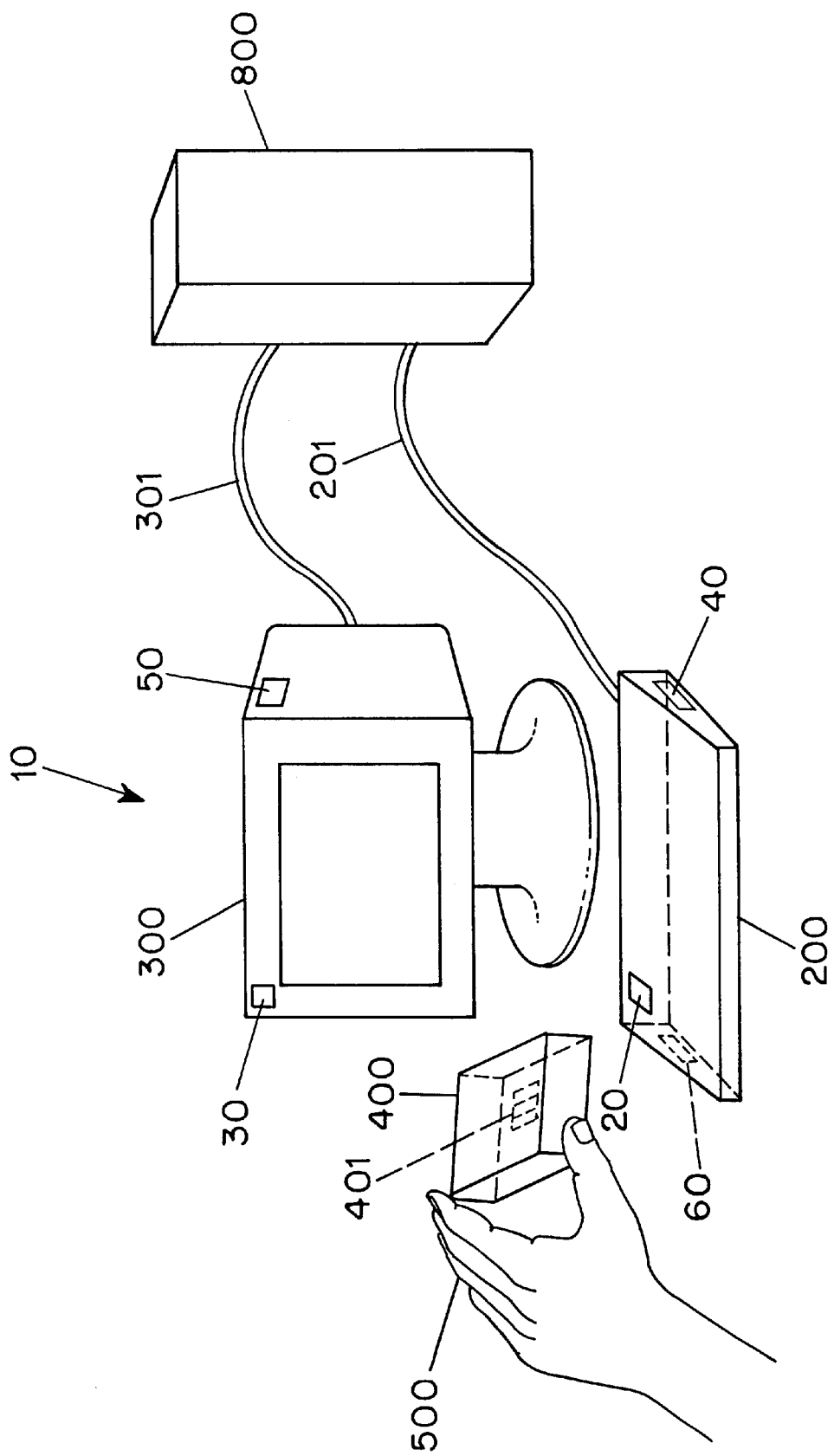
FIG. 7 is a perspective view of an apparatus for reading indicia having parts of different light reflectivity comprising a reader integrated into a keyboard or a monitor, according to another embodiment of the invention.

In one embodiment, the reader 20 is integrated into a right top portion of keyboard 200, as shown in FIG. 1. This facilitates the ease with which a user may scan a barcode. The user 500 may move the article 401 in a right-to-left direction over reader 20. Alternatively, the reader 20 may be integrated into the left top portion of keyboard 200, as shown in FIG. 7. This positioning may be easier for left-handed users. Additionally, a reader 40 may be integrated into the right side portion of keyboard 200 or a reader 60 may be integrated into the left side portion of keyboard 200.

Alternatively, the user 500 can scan barcode 401 with the reader 30, which is integrated into a right top portion of monitor 300. User 500 would move article 401 in a direction lying over a plane which is parallel to the side of the monitor 300 facing the user. Again, the reader 30 may alternatively be placed on the left top portion of monitor 300, as shown in FIG. 7, which may be easier to use for left-handed persons. Furthermore, the reader 50 may be placed on the right side portion of monitor 300, as shown in FIG. 7, or the reader 55 may be placed on the left side portion of monitor 300, as shown in FIG. 8.

Of course, the above described positions of the reader are only exemplary and the present invention encompasses other positions, as needed for different needs and applications.

Figure 8:
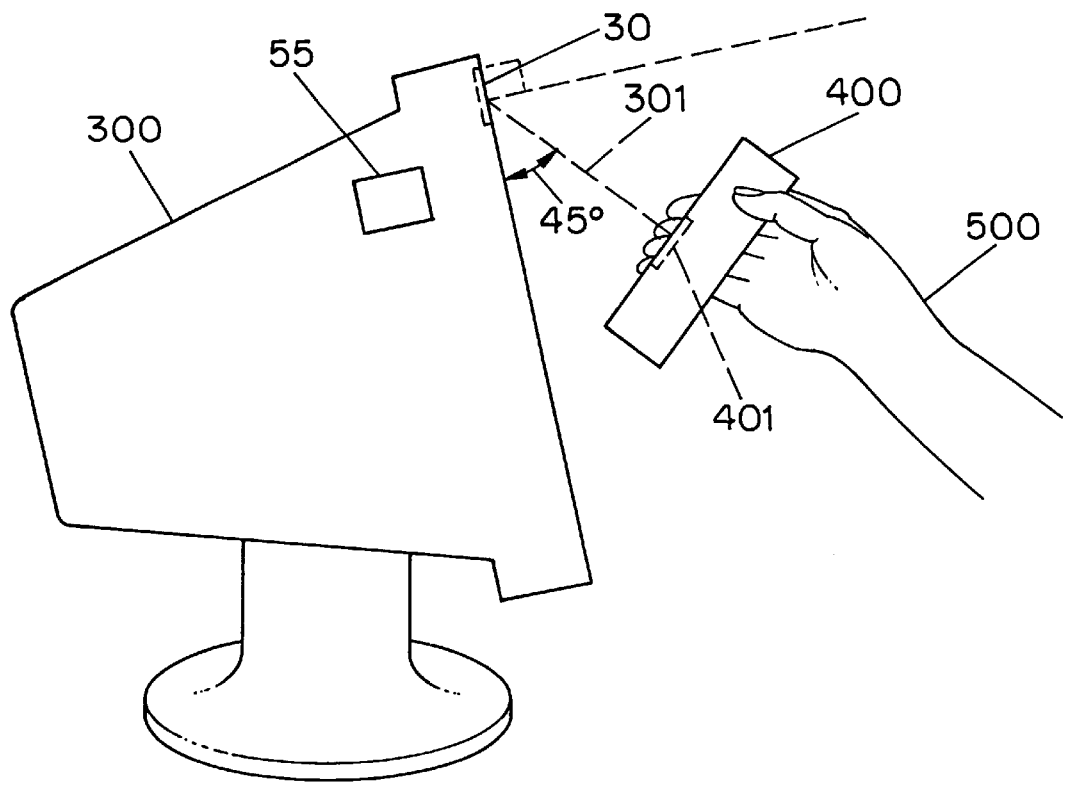
FIG. 8 is a side view of an apparatus for reading indicia having parts of different light reflectivity comprising a reader integrated into a monitor, according to another embodiment of the invention.

In another embodiment shown in FIG. 8, reader 30 is angled down at 45 degrees from a planar surface of monitor 300. This position makes it easy for user 500 to scan a barcode symbol 401 on article 400 because the user=s arm generally approaches the monitor not at a 90 degrees angle with respect to the front planar surface of the monitor, but closer to a 45 degrees angle. Of course, the reader 30 may emit light directed down at a variable angle from the planar surface of the monitor 300, as needed (e.g., 30 degrees instead of 45 degrees). This would apply to reader 20, as well, and may be achieved either by the proper placement of the housing at an appropriate angle (e.g., housing 99 in FIG. 3), the placement or the parts controlling the direction of the light beam (e.g., optics 101, 93 and 94), and/or other means known in the art.

Figure 9:
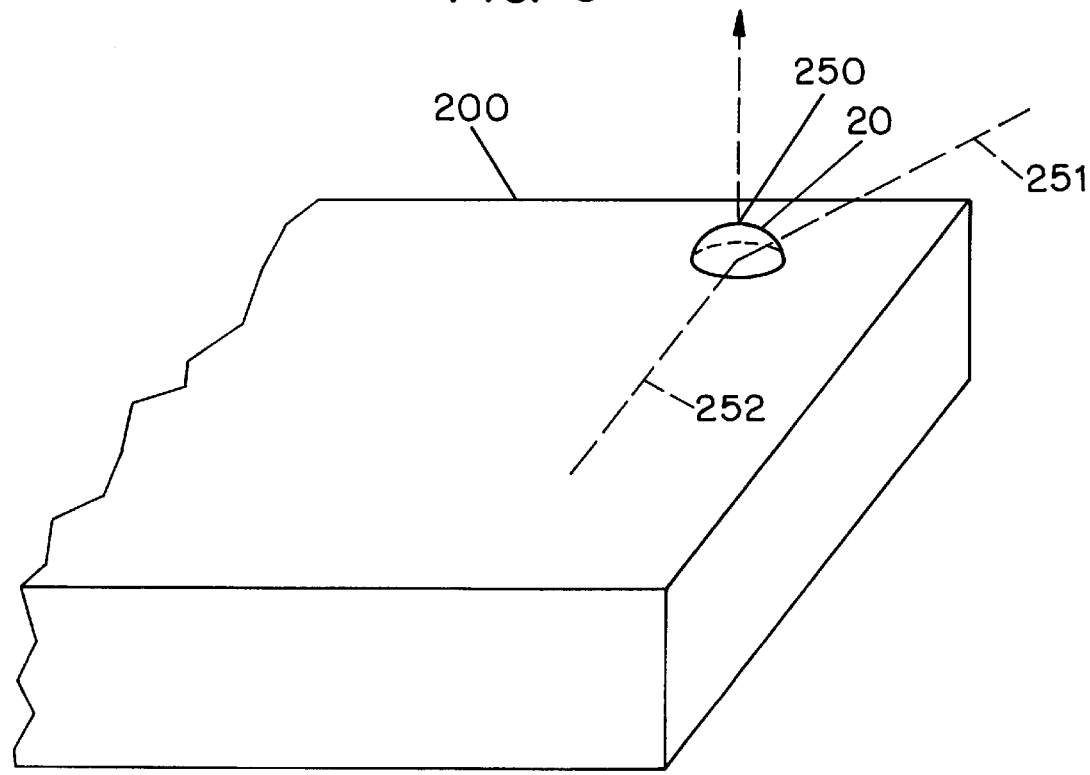
FIG. 9 is a perspective view of an apparatus for reading indicia having parts of different light reflectivity comprising a reader integrated into a keyboard or a monitor, according to another embodiment of the invention.

In another embodiment, as exemplified in FIG. 9, the angle of scan can be adjusted by the user by adjusting the reader 20 as desired. For example, the light beam can be made to come out at the center of the semi-spherically shaped reader 20 at a location 250. The reader 20 is constructed so that it can move in any direction above a planar surface of keyboard 200 (or monitor 300) as needed in a particular situation. For example, the user may rotate the reader 20 to a direction 251, to the right of the keyboard, for one situation and then later change to a direction 252 for a different situation.

Figure 10:
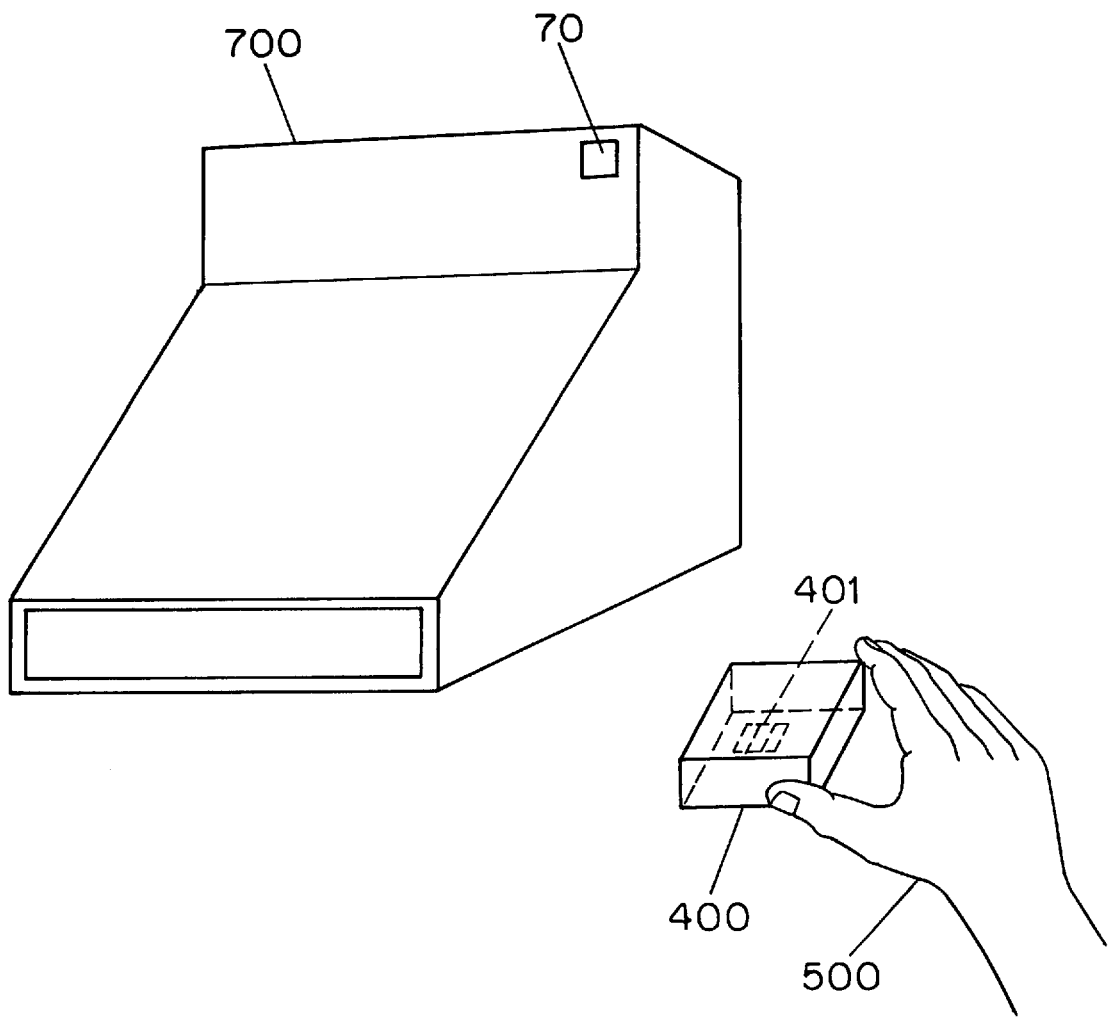
FIG. 10 is a perspective view of an apparatus for reading indicia having parts of different light reflectivity comprising a reader integrated into a point-of-sale unit, according to another embodiment of the invention.

The present invention may also be integrated into a point-of-sale unit, as shown in FIG. 10. Reader 70 is integrated into a right top position on the point-of-sale unit 700 (of course, the position may be varied as needed). User 500 may then scan article 400 by moving barcode symbol 401 (on object 400) over reader 70. A point-of-sale unit may include, for example, a cash register, a lottery ticket dispensing apparatus, or the like. Furthermore, as described above, this embodiment may use a laser scanner or an imaging device; may employ a light emitting means for two-directionally or omni-directionally scanning indicia; may be positioned variably into the point-of-sale unit; and may be angled variably.

Furthermore, in all of the embodiments contemplated in this application, an RFID ("Radio Frequency Identification") reader can be used instead of a laser scanner or an imaging device, to read RFID tags. RFID systems have been disclosed, for example, in U.S. Pat. Nos. 5,768,140, 5,594,228 and 5,814,799, all assigned to the assignee of the present invention and incorporated herein by reference.

The scanner, or the RFID reader, does not have to be permanently embedded into the keyboard as illustrated in FIG. 1. Instead, the module can be detachably embedded in the keyboard. The scanner can be releasably attached to the keyboard via various means, such as snap fasteners, guide rails, etc. When the bar code is near the keyboard, there is no need to take the scanner out of the keyboard and the operation of the unit proceeds as described with respect to FIGS. 1–10. When the bar code is too far away from the keyboard for the scanner to accurately read the bar code, the scanner may be detached ("released") from the keyboard by an operator, in order to bring it closer to the bar code. While detached and mechanically separated from the keyboard ("host device"), the scanner continues to be electrically connected to the keyboard via a retractable cable. The cable provides power to the scanner and also passes data and control signals between the keyboard and the scanner. Scanner's digitizer and decoder can be located in either the scanner or in the keyboard. If these circuits are located in the keyboard, the size of the scanner can be reduced. When the detached scanner finished reading a bar codes, the operator will retract the cable back into the keyboard and the scanner will once again be stowed in the keyboard for operation in the keyboard. In order for the scanner to be mechanically retracted from the keyboard, a mechanical retraction unit, of the type disclosed in U.S. Pat. No. 5,094,396 and which is incorporated herein, will be provided in either the keyboard or the scanner. Other cable retraction units well known in the art can also be used. Locating the retraction unit in the keyboard is preferable in order to minimize the size of the scanner. While the retractable feature has been disclosed with respect to bar code scanners, it is equally applicable to RFID readers. The host device for a retractable scanner can also be a display or a POS terminal.

In another embodiment the reader can be wirelessly interconnected to the host.

While the present invention has been shown and described with reference to preferred embodiments presently contemplated as best modes for carrying out the invention, it is understood that various changes may be made in adapting the invention to different embodiments without departing from the broader inventive concepts disclosed herein and comprehended by the claims which follow.

We claim:

1. An apparatus for reading indicia having parts of different light reflectivity, comprising:

a) a host assembly including a data processor, a keyboard component for inputting data into the processor, and a monitor component for displaying data processed by the processor, at least one of the components having a compartment; and b) a reader for electro-optically reading the indicia to generate an electrical signal related to the indicia, the reader including a housing receivable in the compartment and removable therefrom to a remote position away from said at least one component, the reader further including means for transmitting the electrical signal to the data processor over a wireless medium when the reader is located in said remote position.

2. The apparatus of claim 1, wherein said at least one component is the monitor component.

3. The apparatus of claim 1, wherein said at least one component is the keyboard component.

4. The apparatus of claim 1, wherein the transmitting means is operable at radio frequencies.

5. The apparatus of claim 1, wherein the host assembly includes a cash register component having an interior chamber, and wherein the reader is receivable in the chamber and removable therefrom.

* * * * *